United States Patent [19]

Bell et al.

[11] Patent Number: 4,781,140

[45] Date of Patent: * Nov. 1, 1988

[54] APPARATUS FOR TOWING ARRAYS OF GEOPHYSICAL DEVICES

[75] Inventors: Robert R. Bell; Louis I. Schneider, Jr., both of Houston, Tex.

[73] Assignee: Teledyne Exploration Company, Houston, Tex.

[*] Notice: The portion of the term of this patent subsequent to Feb. 23, 2005 has been disclaimed.

[21] Appl. No.: 143,677

[22] Filed: Jan. 14, 1988

Related U.S. Application Data

[62] Division of Ser. No. 39,152, Apr. 16, 1987, Pat. No. 4,726,315.

[51] Int. Cl.$^4$ .................. B63B 21/66; B63G 8/42; G01V 1/38
[52] U.S. Cl. ................................. 114/244; 114/245; 367/15
[58] Field of Search ............... 114/244, 245, 253, 246; 367/15, 16, 19; 181/108, 110, 111, 112

[56] References Cited

U.S. PATENT DOCUMENTS

| | | | |
|---|---|---|---|
| 3,491,848 | 1/1970 | Giles | 367/20 |
| 4,170,002 | 10/1979 | Strange | 367/23 |
| 4,480,574 | 11/1984 | Bertrams | 114/242 |
| 4,568,232 | 2/1986 | Juelich et al. | 414/138 |
| 4,726,315 | 2/1988 | Bell et al. | 114/244 |

*Primary Examiner*—Thomas H. Tarcza
*Assistant Examiner*—Ian J. Lobo
*Attorney, Agent, or Firm*—William A. Knox

[57] ABSTRACT

A ship is provided with booms that may be extended outwardly from the ship. Arrays of geophysical devices of different genera are towed from the booms, in the water behind the ship. A UHF antenna is located on each boom. A line joining the two antennas defines a long reference base line for determining the absolute heading of the ship with respect to a meridian and to locate the absolute positions of selected towed geophysical devices with respect to two-dimensional space. The booms may be oriented along a line perpendicular to the ship's track, independently of the ship's heading for the purpose of maintaining the integrity of the geometric pattern of the arrays of the towed geophysical devices.

6 Claims, 6 Drawing Sheets

APPARATUS FOR TOWING ARRAYS OF GEOPHYSICAL DEVICES

This is a division of copending application Ser. No. 07/039,152, filed 04/16/87 and now U.S. Pat. No. 4,726,315 issued 2/23/88.

BACKGROUND OF THE INVENTION

1. Field of the Invention

This invention is concerned with towing arrays of geophysical devices in a body of water behind a specially-designed ship for the purpose of conducting three-dimensional geophysical surveys such as might be found in classes 367 and 181/0.5.

2. Discussion of the Prior Art

In seismic surveys at sea, a ship tows a suitable sound source such as an air gun (water guns, gas guns or sparkers may also be used). At intervals of perhaps eight or ten seconds, the sound source is fired to product an acoustic wave having a spectrum in the 10-100 Hz (cycles per second) range. The ship also tows an elongated array of hydrophones. The acoustic waves generated by the sound source propagate through the water, into the earth and are reflected by subbottom earth layers. The reflected acoustic waves then return to the surface to be detected by the hydrophones. The hydrophones convert the acoustic waves to electrical signal which are sent to a signal utilization device for processing and archival storge. From the processed signals, geophysicists produce maps of the respective earth layers.

The energy output of a single sound source of the type hereinbefore listed is relatively weak. In addition, certain types of sound sources create objectionable wave forms such as bubble pulses or are deficient in certain frequency bands within the seismic spectrum. Therefore, the seismic sound sources are grouped in two- or three-dimensional tuned arrays, having a desired geometrical pattery, containing a large number of sources to produce a more robust seismic spectrum.

The array dimensions parallel to the ship's track may be set up easily enough by simply adjusting the lengths of the tow lines to the respective guns of the array. Perpendicular to the track, the lateral dimensions are sometimes established by use of paravanes such as shown by U.S. Pat. Nos. 4,130,078 and 4,525,813. That arrangement is not satisfactory because the locations of towed paravanes are never known accurately. U.S. Pat. No. 4,038,630 teaches use of fixed booms or outriggers mounted on each side of the stern of the ship to increase the lateral extent of the array. A somewhat more elaborate configuration is illustrated in U.S. Pat. No. 4,480,574. Here, several seismic sound sources are towed from pivotable booms on each side of the ship. Each sound source is manipulated by an individual winch, there being several winches distributed along each boom. That teaching is not very practical because first, the winch mechanisms are directly exposed to sea water, subjecting the winches to corrosion problems. Secondly because the winches and cables are quite heavy, the number of winches that can be safely mounted on booms of reasonable size must be limited to avoid structural failure of the booms. It is to be observed that the '630 and the '574 patents teach deployment of geophysical device of but a single genus. namely air guns.

In three-dimensional (3D) seismic exploration, the geophysical ship proceeds along lines of survey separated by some distance such as 80 meters. A typical hydrophone array may be 3000 meters or more long and may include 1000 or more hydrophones, all encased in a plastic jacket. Such a hydrophone array is commonly referred to as a streamer cable. If a single streamer cable is towed along a line of survey and insonified by an array of sound sources, reflection data from a single line of profile are acquired. If two or more streamer cables, towed from fixed points on the ship, laterally separated by the desired survey-line spacing, are towed behind the ship, then two or more lines of profile can be surveyed at one pass of the ship, a decided economy of ship's time and charges.

The beam of a typical geophysical survey ship rarely exceeds 10 to 15 meters. If two streamer cables are towed directly behind each side of the ship, the cable separation is inadequate for dual-line surveying. Attempts have been made to increase the lateral separation of the cables by use of paravanes. But because of the towing drag of a streamer cable, some 3000 to 6000 pounds (as compared with 100-200 pounds drag force for sound sources), paravanes of manageable size cannot achieve the necessary lateral "lift" to hold the cables in position. Furthermore, it has been found that some ships are unable to develop enough power to tow the paravanes at an acceptable velocity for economical survey work.

A long streamer cable under tow in the water is subject to erratic cross currents. The precise position of the cable is unkown. U.S. Pat. No. 4,376,301 teaches use of transponders or pingers submerged below the water surface, outboard of the ship, separated by 20 to 40 meters. Sound pulses radiated by the pingers are detected by special receivers secured along the streamer cable at selected intervals. The travel time between the pingers and the respective receivers is measured to calculate the receiver positions relative to the ship by triangulation. Because of the relatively short base line, 20-40 meters, compared to the great length of the streamer cable, at least 3.0 km, that method is not very accurate. That problem is excaberated in view of errors in the ship's heading which introduce a skew error in the reference base line between the pingers. Heading errors are caused by the unkknown gyro-compass precession rate between in-port calibrations. Therefore the absolute location of the streamer cable in two-dimensional space is indeterminate.

Another cable-location technique is taught by U.S. Pat. No. 4,532,617. That method involves ranging on the streamer cable from two different locations involving use of a second slave ship. The cost of the additional ship makes that practice, as taught by the '617 patent, unattractive.

At least one geophysical contractor advertises use of a tail buoy secured to the far end of the streamer cable. The tail buoy is equipped with a navigational device and the head end of the streamer cable is held in place by paravanes. Although the location of the tail of the streamer cable may be known, the location of the head end is not accurately known because of the paravane problem mentioned supra. That method is impractical.

SUMMARY OF THE INVENTION

It is an object of this invention to provide a means for deploying a number of geophysical devices of different kinds into a body of water, from a ship. It is a further object of this invention to provide means for determining the absolute position in two-dimensional space of the individual geophysical devices.

In accordance with an aspect of this invention an elongated rotatable boom is mounted on each side of the stern of a ship. The booms may be rotated from a stowed position on a deck of the ship to an extended position perpendicular to the ship's track. A first plurality of geophysical devices of a first kind, which may be seismic sound sources are suspended from the booms at spaced-apart intervals. A first traveling means is provided for manipulating selected ones of said first plurality of devices. A second traveling means is provided to distribute a second plurality of geophysical devices, which may be streamer cables, along each boom at other specified spaced-apart intervals.

In accordance with another aspect of this invention, a plurality of individually powered winches are mounted on the inboard end of each boom. By means of interconnecting cables, each winch manipulates a corresponding geophysical device of the first kind such as a seismic sound source. The group of winches taken as a whole, mounted on the inboard end of each boom, serves as a counterweight for that boom.

In accordance with yet another aspect of this invention, an electromagnetic navigational signal receiving means, such as an antenna, is mounted on the outboard end of each boom, for receiving navigation signals thereby to determine accurately, the absolute position in two-dimensional space of the ends of the booms. The separation of the two antennas is equal to at least 100 wavelengths of the navigation signal. A third antenna may be mounted at the bow of the ship, thereby to accurately fix the position of the bow of the ship as well as the outboard tips of the booms, in two-dimensional space. From those data, the absolute heading of the ship, relative to a meridian, may be determined.

In accordance with a further aspect of this invention, an acoustical device, such as a piezo electric pinger, is secured in the water at a known position beneath the antenna at the tip of each boom. The pingers radiate acoustic pulses at a frequency in the range of 3.5 to 12.5 kHz or higher, well above the seismic frequeny spectrum. The pingers are used to measure the ranges to the geophysical devices of a second genus, such as seismic streamer cables. From those measurements, the absolute position of the streamer cables can be determined relative to two-dimensional space. The separation of the pingers is equal to at least 200 wavelengths of the radiated acoustic pulse.

In accordance with another aspect of this invention, the first plurality of geophysical devices may include devices of genera other than seismic sound sources, such as one or more magnetometers or gas seep detectors.

In accordance with an aspect of this invention, the geophysical devices of a second genus include receiver means for receiving acoustic signals from the pingers.

BRIEF DESCRIPTION OF THE DRAWINGS

The benefits and objectives of this invention will be better understood by reference to the appended detailed description and the drawings wherein.

DETAILED DESCRIPTION OF THE PREFERRED EMBODIMENT

Figure 1:
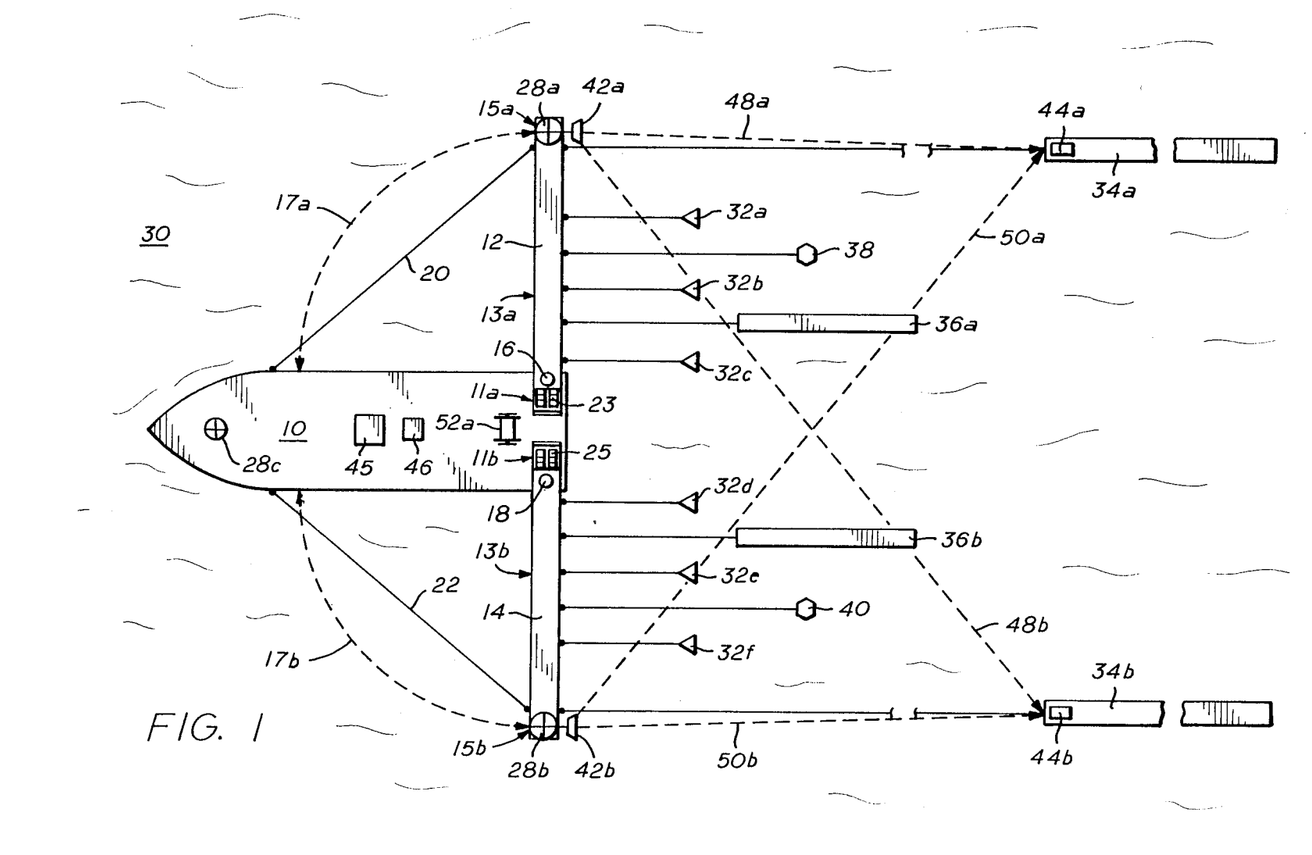
FIG. 1 is a schematic plan view of a geophysical ship towing a plurality of geophysical devices of different genera.
Figure 2A:
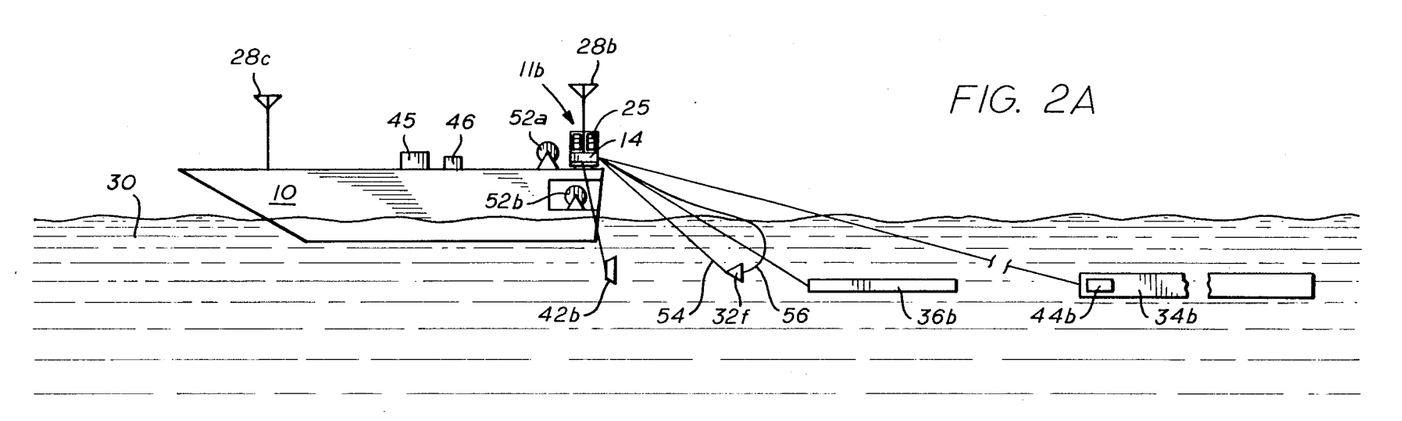
FIG. 2a is a schematic side view of the ship of FIG. 1.
Figure 2B:
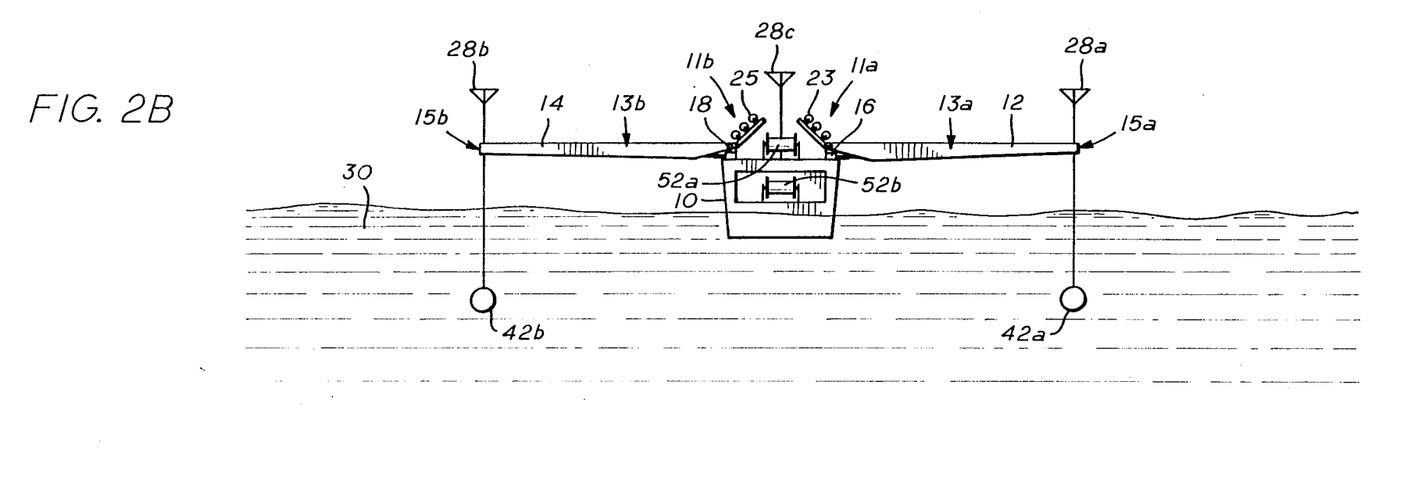
FIG. 2b is a schematic stern view of the ship of FIG. 1.

Referring now to FIGS. 1, 2a and 2b, there are shown schematically plan, side and stern views of a ship 10 having booms 12 and 14, both shown in the extended position, which are rotatable about pivots 16 and 18 from the extended position as shown to a stowed position on deck as shown by dashed arcs 17a and 17b. Note that the tow lines and geophysical devices are not shown in FIG. 2b to avoid excessive complexity of the drawing. When extended, the booms may be guyed by lines 20 and 22 in a conventional manner. The booms, 12 and 14 have inboard portions 11a and 11b relative to pivot 16 and 18. The booms also have outboard portions 13a and 13b, including ends 15a and 15b, relative to pivots 16 and 18. The inboard portions 11a and 11b of booms 12 and 14 serve as counterweights. The counterweights include a plurality of cable winches such as 23 and 25, to be described in more detail later. The outboard portion 13a of the boom 12 is hinged along a horizontal axis by hinge pin 27a (FIG. 3) and may be elevated to a desired angle above a horizontal plane by a hydraulic ram 29a that is interconnected between pivot 16 (FIG. 3) and the underside of the boom. Similarly for boom 14. The booms are about 40 meters long measured from the pivot points 16 and 18. The booms are of closed box construction (see FIG. 5) rather than open truss construction and are buoyant with respect to the water. The weight of a boom is about 18,000 pounds while the counterweight weighs more than 10,000 pounds.

At the ends 15a, 15b of the outboard portions of the booms there are mounted electromagnetic navigation signal receiving means such as antennas 28a and 28b. The lengths of the booms are a multiple of the wavelength of the navigation signals. In a preferred embodiment of this invention, the frequency of the navigation signals preferably is in the UHF range of 420 to 450 MHz. Assuming a propagation velocity of 299,670 km/sec over salt water, the signal wavelengths will range from 0.71 to 0.67 meter. The separation of the antennas thus is more than 100 wavelengths of the navigation signal. A line joining the two antennas, thus defines a long reference base line whose absolute orientation is known in two-dimensional space. The addition of a third antenna 28c at the bow of the ship provides a third absolute position reference. The signals from the three antennas may be combined in navigation computer 46. Because the phase difference between the signals received at the three antennas can be resolved to less than one cycle, the absolute heading of the ship, relative to a meridian of longitude, can be determined to less than 30 minutes of arc. The long base line between antennas in terms of the wavelength of the navigation signal, permits a resolution in the absolute positioning of better than one part in a hundred.

A plurality of geophysical devices of different genera are towed in water 30 behind ship 10. They are secured to booms 12 and 14 by suitable tow lines, air lines (not shown) and data-signal conductor lines (not shown). The devices of a first genus, include seismic sound sources such as air guns 32a–f, devices of a second genus such as hydrophone streamer cables 34a and 34b, mini-streamers 36a and 36b, and perhaps a magnetometer 38 and a gas seep detector 40. The tow lines to the geophysical devices of the first genus are payed out or reeled in by means of the winches such as 23 and 25. Six winches and six devices are shown for each boom but up to twelve are preferred. The respective genera of geophysical devices are distributed along the booms at pre-selected spaced-apart intervals such as every two meters or other spacings by first and second traveling means that will be described in more detail later.

Piezo-electric acoustic devices or pingers of any commercial type, 42a and 42b are suspended beneath the ends of the outboard portions of the booms 12 and 14, at a known position in water 30 relative to antennas 28a and 28b. Acoustic devices 42a and 42b radiate acoustic pulses at a selected frequency in the range of 3.5 to more than 12.5 kHz, substantially above the seismic spectrum of 10 to 100 Hz, to avoid interference therewith. At a water velocity of 1500 meters per second, the separation (80 meters) between the pingers is more than 200 wavelengths. In operation, preferably every two or three seconds the pingers insonify appropriate receivers 44a and 44b mounted at the leading ends of streamer cables 34a and 34b. The transmission instant of a pinger pulse is sent to seismic signal processor 45. the time of receipt of that pulse at the receivers 44a and 44b is transmitted back to processor 45 over suitable conductors (not shown). From the travel time differences between emission of a pulse from pinger 42a to receipt of that pulse at receivers 44a and 44b, the ranges 48a and 48b to the receivers are computed (dashed lines). Similarly the ranges 50a and 50b are computed from pinger 42b to receivers 44a and 44b. From the cross-triangulation results, the absolute positions of the streamer-cable head ends are determined in two-dimensional space.

Although only two receivers 44a and 44b are shown in each streamer cable 34a and 34b, it is to be understood that many more such receivers are preferably distributed at spaced-apart intervals along the streamer cables. Because the ship heading is accurately known, there is virtually no skew error in the orientation of the reference base line between antennas 28a and 28b and the corresponding pingers 42a and 42b. It is to be understood of course, that the mini-streamers 36a and 36b could be fitted with suitable receivers such as 44a and 44b. However, the need is less critical because the ministreamers are relatively close to the ship.

Pingers 42a and 42b are normally towed at a depth at least as great as the depth of the air guns. The air bubble from the air guns interferes with the propagation path of the pinger pulses. However because the air bubble rises to the water surface following firing of the air gun, by placing the pinger at or below the gun level, interference does not occur.

The seismic sound sources 32a–f, for simplicity hereinafter termed guns or air guns by way of example but not by way of limitation, are trailed only two or three hundred feet behind the ship and accordingly, their position is well known. It is primarily the positions of the head ends of the streamer cables that is criticl because they stretch for several kilometers behind the ship.

When not in use, the streamer cables are moved inboard along the booms and are transferred by any convenient means to cable storage reels 52a and 52b. One reel may be mounted on the upper deck and the other may be mounted on a lower deck of the ship or both reels may be mounted on the same deck. The traveling means for moving the streamer cable along the booms will be described in detail below.

Of interest is the method for controlling the depth of the guns such as 32f. The gun is secured to boom 14 by a tow cable 54 (FIG. 2a). A firing line 56 including trigger circuits, timing circuits and an air-supply hose is arranged in a bundle such as taught by U.S. Pat. No. 4,525,813. Although the tow line is taut, an excess of firing-line slack is payed out so as to form a loop behind the gun due to water resistance when the gun is under tow. It turns out that the more excess firing line that is payed out, the deeper the gun descends in the water for a given length of tow cable 54. By that means the gun depth can be controlled quite accurately. It is of course, to be understood that all underwater geophysical devices are furnished with depth detectors of a conventional type which transit the depth read-outs to the central seismic processor 45. The depths of the streamer cables and mini-streamers are controlled by commercially-available hydroplanes or birds. The pingers 42a and 42b are held in a known position beneath antennas 28a and 28b by means of V-fin depressors such as are made by Endeco Corp. of Marion, Ohio. The design of the V-fin is such that the pingers are held nearly vertically beneath the antennas 28a and 28b at normal ship speeds.

The remainder of this discussion will now center around the details of the first and second traveling means, the winch assemblies, and the boom rotation mechanism. Since both booms are identical we shall describe boom 12 as typical.

Figures 3, 3A:
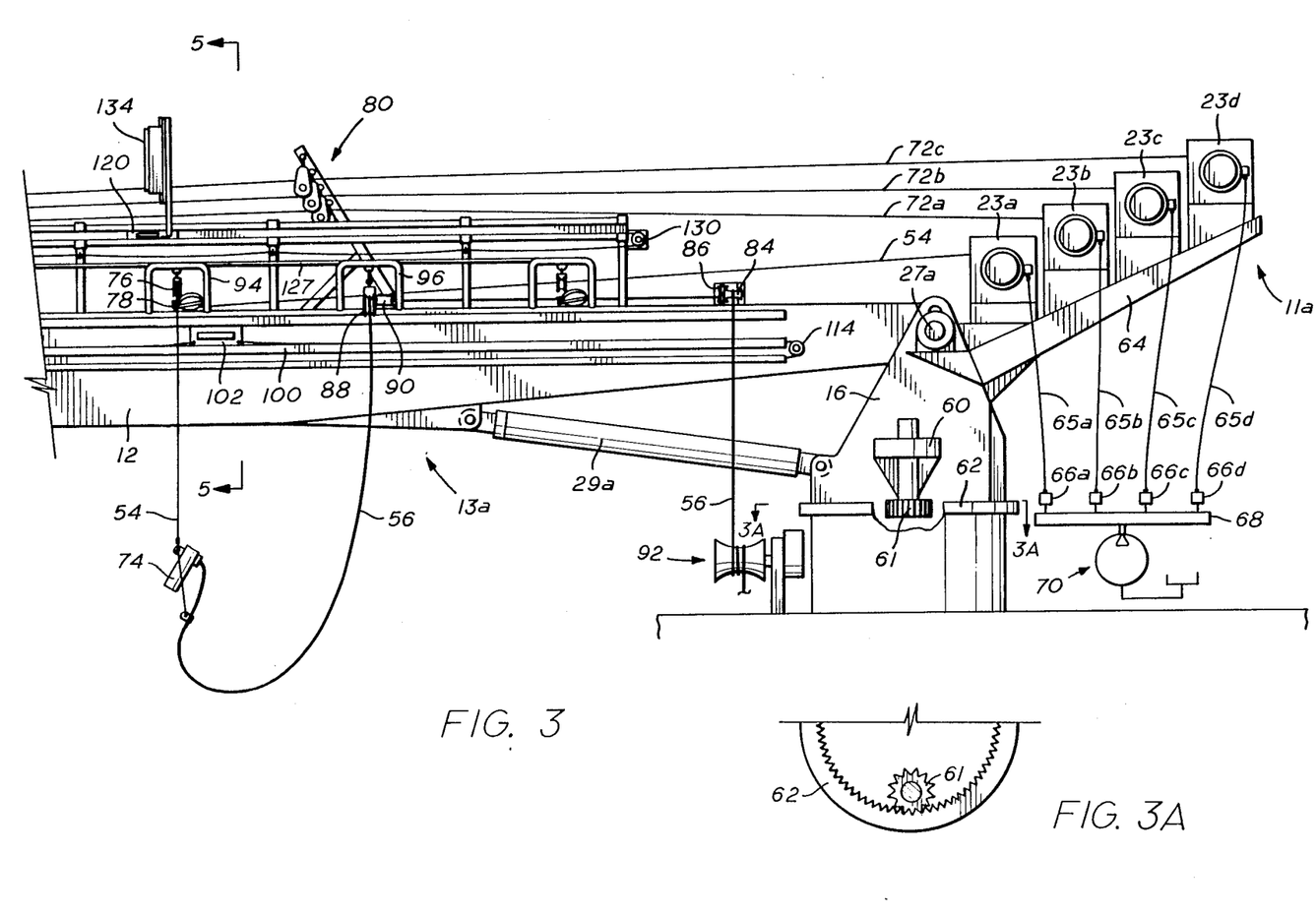
FIG. 3 shows details of a typical boom.
FIG. 3a is a partial section along 3a—3a of FIG. 3.

FIG. 3 is a side view of a typical boom assembly such as 12 (FIG. 1), showing construction details.

As previously stated, the boom consists of an inboard portion 11a and an outboard portion 13a relative to pivot 16. The boom may be rotated from a stowed position on deck (FIG. 7) to an extended position (FIGS. 1 and 2b) by a motor 60, preferably hydraulic, having a pinion 61 that meshes with an internally-hobbed ring gear 62 shown in FIG. 3a. Pivot 16 is quite massive being about 1.5 meters in diameter. The outboard portion of boom 12 is hinged by a horizontally-disposed pin 27a. Hydraulic ram 29a is provieded to raise the outboard portion 13a of boom 12 to a desired angle above a horizontal plane. Although a single ram is shown in FIG. 3, three such rams are preferred.

The inboard portion 11a of boom 12, which also serves as a counterweight, includes a platform 64 upon which are mounted a plurality of cable winches 23a–d. Four are shown in FIG. 3 but up to twelve are preferred. Hydraulic power is applied to the winches individually through lines 65a–d and control valves 66a–d that are coupled through a manifold 68 to a hydraulic supply 70 of anay conventional type. The winches could of course, be electrically or pneumatically powered. A tow cable 54 interconnects winch 23a with an air gun 74 through suitable sheaves 76 and 78. Air gun 74 is initially suspended from the outboard portion 13a of boom 12 by the tow cable 54. Winch 23a may then be activated to lower the air gun in the water for towing behind the ship as shown in FIG. 1. Other cables 72a, 72b, 72c interconnect winches 23a, 23c, 23d to other guns distributed along the boom. Cables to the more remote guns may be threaded through suitable snatch blocks 80 to prevent entanglement.

Assuming that the seismic sound sources are air guns, an air hose, electrical line to trigger the guns, depth-indicator read-out conductors and other auxiliary data lines, are packed together in a firing line bundle as hereinbefore described. The firing line 56 passes from the deck of the ship and over snatch blocks 84 and 86, along the outboard portion of the boom, over snatch blocks 88 and 90 and thence to gun 74. Firing line 56 is manipulated independently of tow cable 72 by means of a hydraulically-driven cathead 92 of any conventional type. Firing line 56 remains slack with respect to two cable 72 and may be used to control the gun depth as shown in FIG. 2a. Firing lines to other guns are arranged similarly along the boom.

Figure 4:
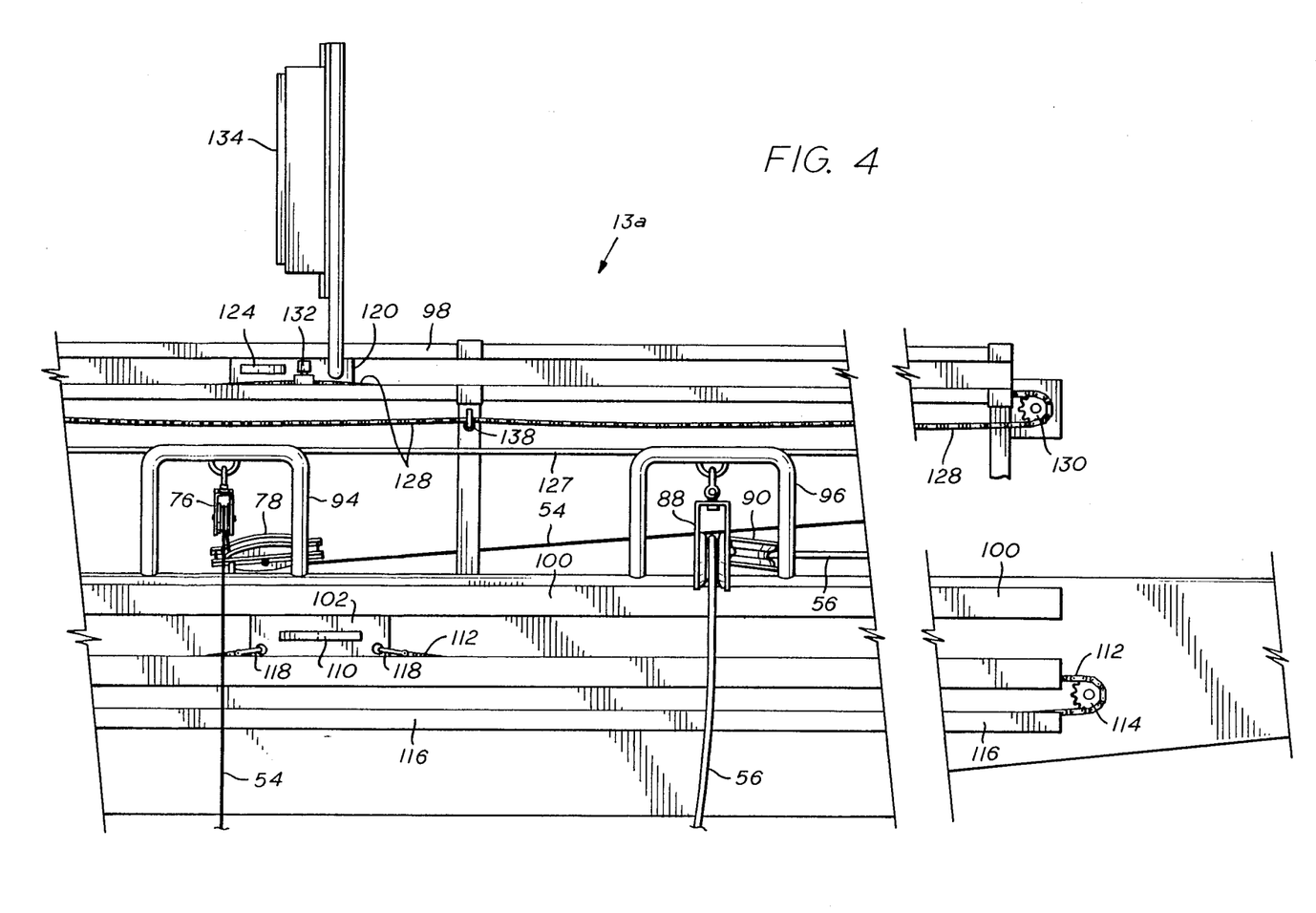
FIG. 4 is a side view of a typical boom.

FIG. 4 illustrates in somewhat greater detail the method of attachment of snatch blocks 76, 78 and 88, 90. Note that snatch blocks 76 and 88 are suspended from hangers 94 and 96 that are welded to the boom structure. As shown in FIG. 3, tow cable 54 is threaded through snatch blocks 76 and 78 while firing line 56 is threaded through snatch blocks 88 and 90. Corresponding sets of snatch blocks are provided for other guns along the boom.

Figure 5:
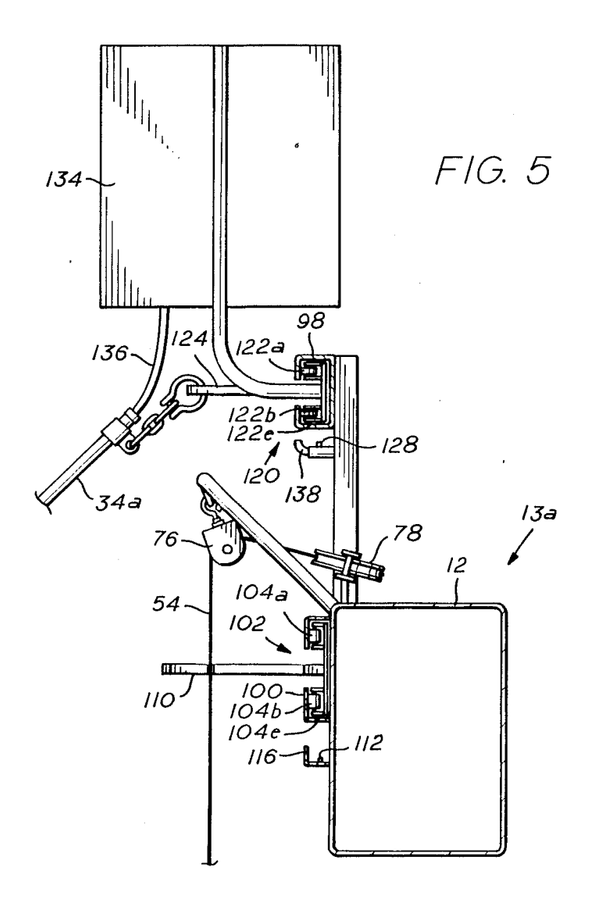
FIG. 5 is an end view along 5—5' of FIG. 3 of a typical boom.
Figure 5A:
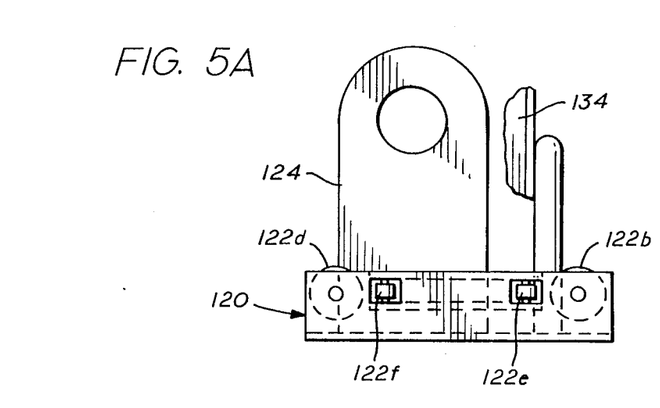
FIG. 5a is a bottom view of carriage 120 showing construction details.
Figure 5B:
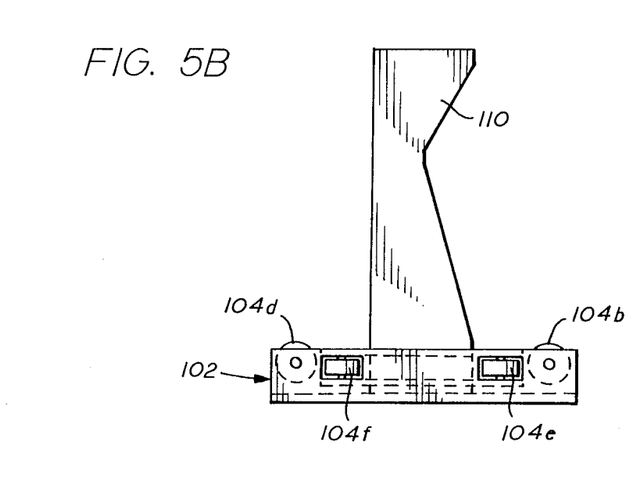
FIG. 5b is a view from below of trolley 102 showing construction details.

FIG. 5 is a cross section of boom 12 along line 5—5' of FIG. 3. Referring now to FIGS. 4, 5, 5a and 5b the outboard portion 13a of boom 12 supports an upper track 98 and a lower track 100. A first traveling means 102, such as a trolley rides along the lower track supported by thrust-rollers and support rollers 104a-f. Traveling means 102 includes an outwardly projecting, vee-shaped yoke 110 for engaging the tow cable of a selected air gun thereby to move the gun along boom 12 back towards the ship for servicing. It should be observed that yoke 110 will only engage the tow line of a gun that is suspended directly beneath the boom. For other guns that are under tow, the tow cables extend at an angle from the boom as shown in FIG. 2a and therefore are clear of the yoke.

First traveling means 102 is moved along the outboard portion 13a of boom 12 by means of an endless cable or chain 112 that is driven by a suitable hydraulic motor 114 located near pivot 16. A channel 116 provides return support for the cable or chain. The cable or chain 112 is bolted to trolley 102 by suitable clamps 118. The cable or chain 112 is conventionally supported at the outboard end 15a of the boom by an idler pulley (not shown).

A second traveling means or carriage 120 moves along upper track 98. Like trolley 102, carriage 120 is provided with thrust and support rollers 122a-f. A padeye 124 extends outwardly from carriage 120 for receiving a geophysical device of a second genus such as a seismic streamer cable 34a. Carriage 120 is movable along the outboard portion 13a of boom 12 by means of an endless chain or cable loop 128 that is actuated by hydraulic motor 130. Cable 128 is secured to carriage 120 by means of a remotely-controlled solenoid clamp 132. Solenoid clamp 132 provides means for engaging or disengaging carriage 120 from actuating cable 128.

Thus, a first carriage such as 120 can be moved to a desired position along boom 12, whereupon it is disengaged from the cable. Other carriages (not shown) can then be individually and selectively clamped to cable 128, moved into position and then disengaged. Thus, a plurality of geophysical devices of a second genus can be distributed along the outboard portion 13a of boom 12 at spaced-apart intervals by use of a single actuating cable. Carriage 120 includes a junction box 134 for receiving electrical conductors 136 from seismic streamer cabler 34a. Support hooks such as 138 distributed along the boom provide support for the return portion of cable 128. The far end of cable 128 is supported by an idler pulley at end 15a of boom 12 (not shown).

In geophysical surveying, it is necessary to arrange the guns in arrays having a selected geometrical pattern relative to the track of the ship over the sea floor. The purpose of an array is to enhance preferred frequencies in the seismic spectrum, and more importantly, for purposes of beam steering. If the array geometry is skewed, beam-steering results become distorted. In fine weather, the ship's heading is substantially the same as the ship's track, absent severe sea currents. The array geometry is not skewed relative to the track. In bad weather and in the face of strong ocean currents, the ship must crab into the wind and current to maintain the desired track. The crab angle may be quite large. If now, the booms 12 and 14 were constrained to remain perpendicular to the fore-and-aft axis of the ship as in the prior art, the geometry of the array of towed guns, relative to the ship's actual track over the sea floor, would be severely distorted.

Figures 6, 7:
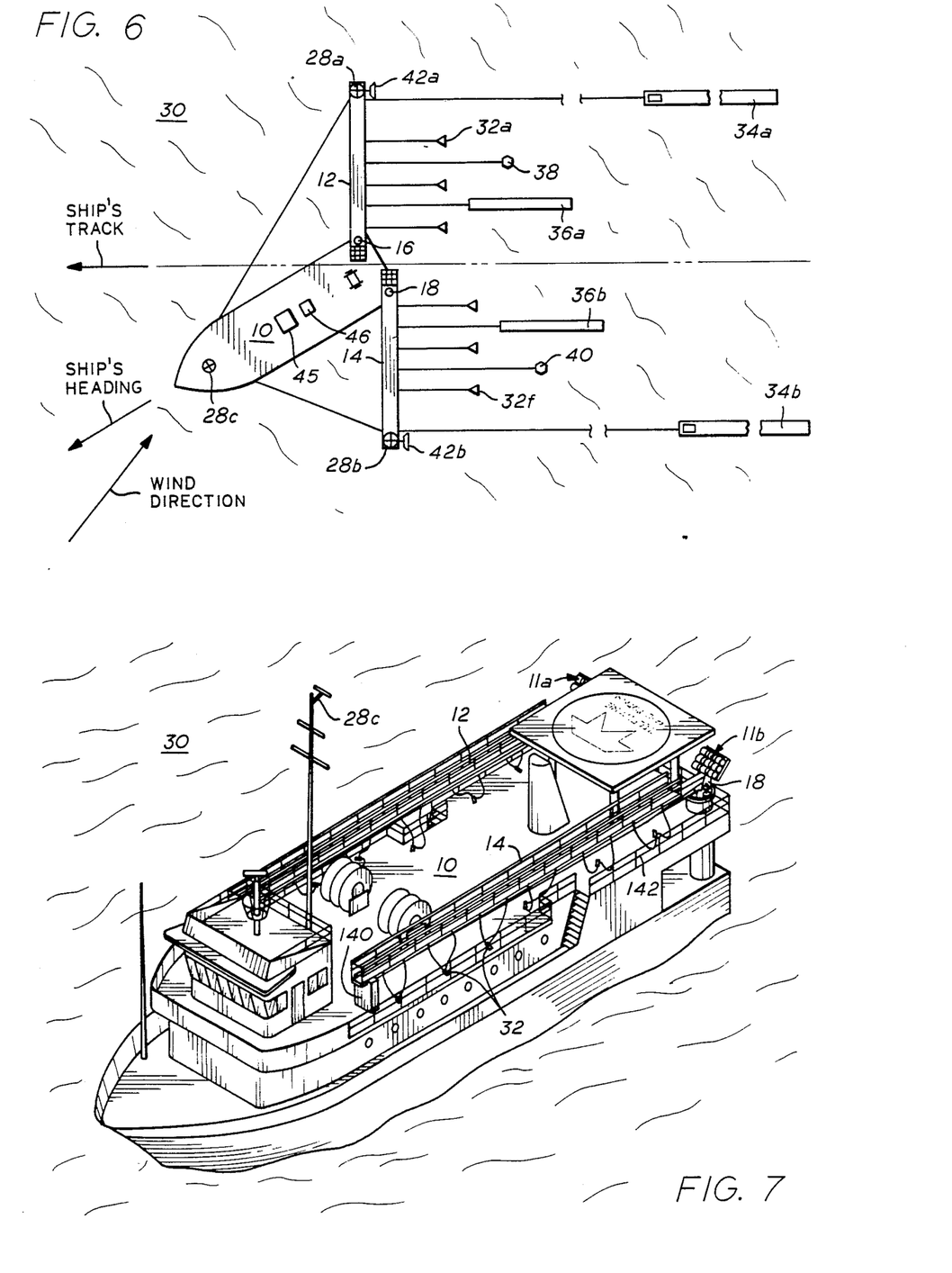
FIG. 6 shows a means for maintaining the integrity of the geometry of a sound source array relative to the ship's track.
FIG. 7 shows a typical boom in the stowed position on a deck of the ship.

FIG. 6 shows ship 10 headed into the wind at a considerable angle to the desired track. An array of guns (triangles) such as 32a-f of FIG. 1, is towed behind the ship. Booms 12 and 14 are rotated about pivots 16 and 18 so as to remain perpendicular to the ship's track independently of the heading of the ship. Because of the data provided by the three antannas 28a-c, the ship's absolute heading, as well as its absolute position in two-dimensional space, is known very accurately. Navigation computer 46 processes the navigation signals so as to provide information to a servo system of any desired type (not shown) to cause motor 60 (FIG. 3) to automatically swing the corresponding boom to a direction perpendicular to the ship's actual track.

Pivots 16 and 18 are fixedly mounted on each side of the stern of the ship, separated laterally by about 8 meters. Assuming a crab angle of about 25 degrees, the linear displacement of the pivots relative to the ship's track is about 3.5 meters. That displacement is relatively trivial compared to the 40-meter diagonal skew of the devices towed behind the ship had the booms been constrained to remain perpendicular to the ship's heading. Furthermore, the integrity of the prescribed survey-line spacing is preserved.

FIG. 7 shows the ship 10 with the booms in the stowed position on deck. When stowed, the boom such as 14 rests on a cradle such as 140. The guns, such as 32, are suspended from the booms and may rest on deck, as shown, for servicing.

In operation, the booms initially are in the stowed position as shown in FIG. 7. The air guns are suspended directly beneath the booms by their corresponding tow cables. The firing line remains slack. Upon commencement of a survey, the booms are elevated by the hydraulic rams until the suspended air guns clear the deck rail 142 of ship 10. The booms are then swung outwardly around pivots 16 and 18 as shown in FIG. 1. The geophysical devices of a second genus such as the seismic streamer cables 34a and 34b are payed out from their respective cable storage reels 52a and 52b and are then transferred to corresponding second traveling means such as a carriage 120. The streamer cables are then distributed along the outboard portions of the booms at spaced-apart intervals. Only one streamer cable is shown for each boom, but more than one streamer cable may be deployed. It should be observed in FIGS. 3, 4, and 5, that a guard rail 127 is secured between the hangers along the boom such as 94 and 96 to prevent the streamer cable from becoming entangled therewith.

After the streamer cables have been deployed and distributed, the suspended air guns are lowered into the water behind the ship from their respective tow cables by means of their corresponding winches such as 23a–d. The air guns may be towed at different distances behind the ship to form an array of desired geometry. Of course, as each gun is lowered away, its corresponding firing line is payed out over cathead 92. Once in the water, each gun is adjusted to a desired depth by paying out firing-line slack as shown in FIG. 2a.

During operation, a gun malfunction may occur. In that event, the defective gun is reeled in by the corresponding winch along with its firing line. At the same time, first traveling means, trollery 102, is moved along the boom outwardly away from the ship until the trolley is beyond the appropriate snatch block hanger such as 94, FIG. 5. When the gun is out of the water and hanging vertically beneath the boom on its tow cable, trolley 102 is moved along the boom towards the ship. Yoke 110 then engages the tow cable such as 54 to manipulate the defective gun back aboard the ship. Of course, during that process, the tow cable and firing line are slacked-off as required.

Once the ship is underway, the navigation system 46 tracks the positions of the seismic streamer cables and provides ship's heading information. The heading information is continuously compared with the ship's gyro compass to correct for precession error. The navigation system also provides correction information to a suitable servo system for automatically maintaining the proper orientation of the booms relative to the ship's track independently of the heading of the ship.

Those skilled in the art will doubtless conceive of variations in the design and operation of this invention, but which will fall within the scope and spirit of this disclosure which is limited only by the appended claims.

We claim as our invention:

1. An arrangement for maintaining the integrity, with respect to a line of survey, of the geometric pattern of an array of geophysical devices that are distributed over at least two spatial dimensions and are towed through a body of water behind a ship, comprising:

a pivotally-mounted boom, having an outwardly-extending portion, mounted on each side of the ship;

means for distributing a plurality of towed geophysical devices along the outwardly-extending portion of each said boom at spaced-apart intervals; and means for orienting each said boom perpendicular to the track of the ship over the water bottom along the line of survey, independently of the heading of the ship relative to the surface of the water.

2. The arrangement as defined by claim 1, wherein:

said means for orienting includes electromagnetic navigational signal-receiving means, mounted on the outwardly-extending portion of each said boom for defining a reference line having a known orientation in two-dimensional space, relative to the line of survey.

3. A method for controlling the skew of the geometric pattern of a multidimensional array of geophysical devices towed behind a ship through a body of water along a line of survey, comprising:

pivotally mounting a boom, having an outwardly-extending portion, on each side of a ship;

distributing a plurality of geophysical devices along each said boom at spaced-apart intervals to define the lateral dimension of the array;

individually adjusting the distance behind the ship of respective ones of said plurality of geophysical devices to define the longitudinal dimension of the array; and pivoting said booms relative to the ship, thereby to orient the booms perpendicular to the track of said ship as it moves along a line of survey, but independently of the heading of the ship.

4. The method as defined by claim 3 wherein the orientation process includes the steps of:

establishing a reference base line between first and second spaced-apart points, the respective points being located on the outwardly-extending portion of a corresponding one of the pivoted booms; and measuring the orientation of said reference base line in two dimensional space.

5. The method defined by claim 4, wherein the step of measuring includes the step of:

positioning first and second electromagnetic signal-receiving antennas at said first and second points, the separation between the antennas being long with respect to the wavelength of the navigation signals, for measuring the absolute orientation of said reference base line in two-dimensional space.

6. The method as defined by claim 5, further including the steps of:

positioning a third electromagnetic navigational signal-receiving antenna near the bow of said ship; and resolving the navigational signals received by the first, second and third antennas for measuring the absolute heading of the ship relative to the line of survey, independently of the measured orientation of said referrence base line.

* * * * *

UNITED STATES PATENT AND TRADEMARK OFFICE
CERTIFICATE OF CORRECTION

PATENT NO. : 4,781,140

DATED : November 1, 1988

INVENTOR(S) : Robert R. Bell, Louis I Schneider

It is certified that error appears in the above-identified patent and that said Letters Patent is hereby corrected as shown below:

```
Col. 1, line 20, change "product" to --produce--;
        line 28, change "signal" to --signals--;
        line 30, change "storge" to --storage--;
        line 40, change "pattery" to --pattern--;
        line 66, change "device" to --devices--.

Col. 5, line 37, change "the" to --The--.

Col. 7, line 20, change "two" to --tow--.
```

Signed and Sealed this

Fourteenth Day of March, 1989

Attest:

DONALD J. QUIGG

*Attesting Officer*   *Commissioner of Patents and Trademarks*